May 13, 1952      W. P. SOLMES      2,596,873
VISOR FOR VEHICLES AND THE LIKE
Filed Aug. 10, 1950
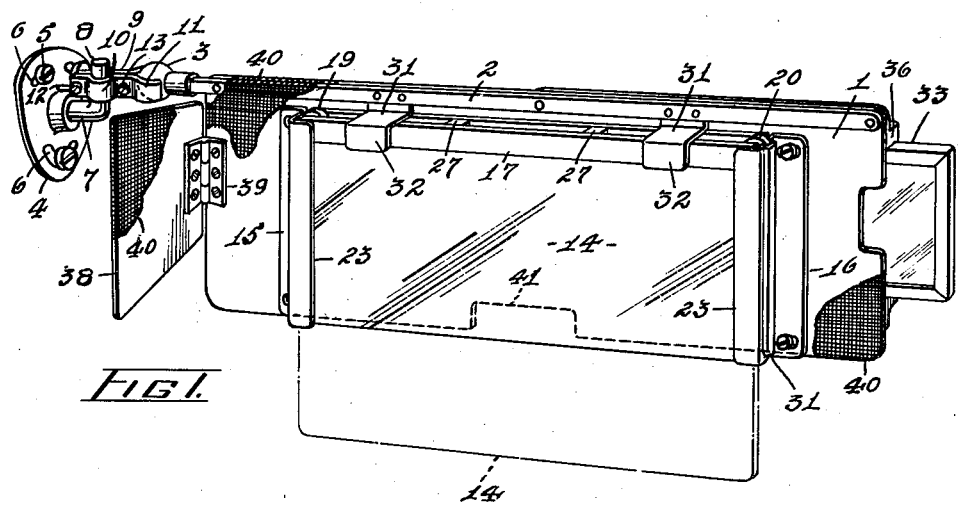
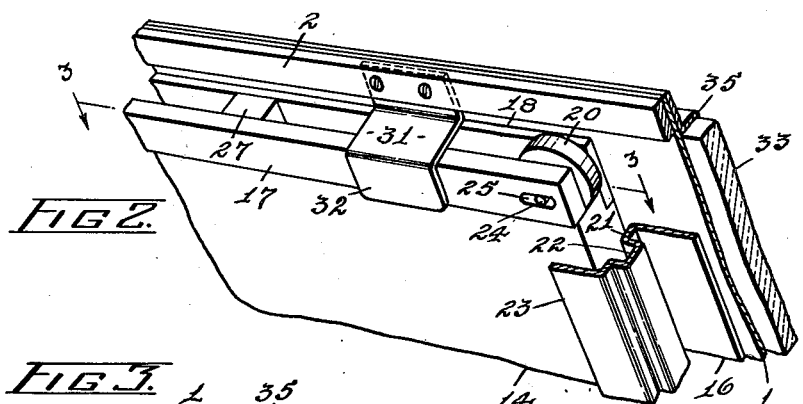
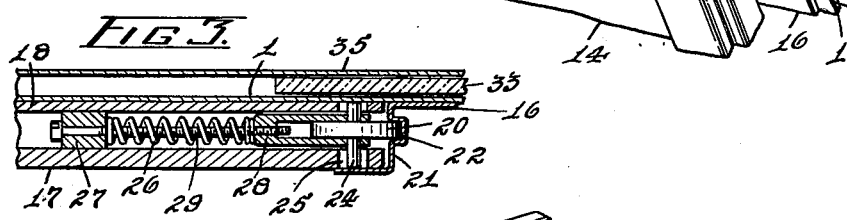
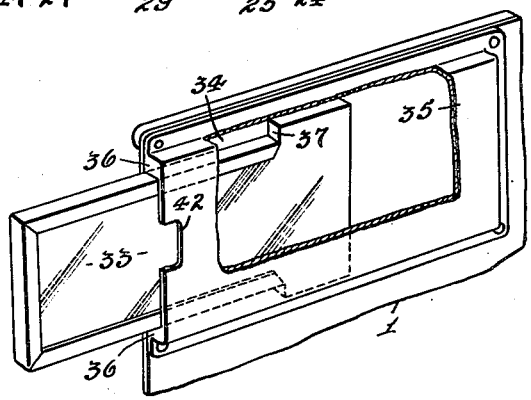
INVENTOR,
William P. Solmes Patented May 13, 1952

2,596,873

UNITED STATES PATENT OFFICE 2,596,873

VISOR FOR VEHICLES AND THE LIKE

William P. Solmes, Toronto, Ontario, Canada

Application August 10, 1950, Serial No. 178,665

6 Claims. (Cl. 296—97)

1

The invention relates to visors for vehicles and the like, as described in the present specification and shown in the accompanying drawings that form a part of the same.

The desirability of shading the eyes of the driver from the glare of the sun, and blinding headlights, as a matter of protection for the eyes and as an accident preventative, has resulted in the availability of visors of various types. Such devices, however, have only been useful in shading the eyes from above and are of no value when driving into the sun or directly towards glaring headlights, in which case the motorist finds it advisable to provide other means of protecting the eyes such as colored glasses, assuming that such are at hand, otherwise he must endure the hazard consequent upon driving while in a state of partial or complete blindness, as well as suffering injury to the eyes from the tissue-damaging ultra-violet and infrared rays of the sun, during day driving, which can adversely affect the vision for a protracted period after exposure.

The present invention has for its chief object the provision of a simple device, readily attachable to a vehicle, which will include all of the aids ordinarily necessary to safe and unrestricted vision, such attachment or device embodying a main, readily adjustable, opaque member constituting a shade for the eyes from above, a pair of panels of colored transparent material normally concealed within said eye shade and partially withdrawable therefrom independently of each other, to positions before the eyes of the driver in the direct line of vision and before the rearview mirror, respectively, and a swinging wing member adapted to be brought into position to shade the eyes from the side.

With the above and other objects in view the invention consists in the novel features of construction, arrangements and combinations of parts set out in the present specification and more particularly pointed out in the claims for novelty following.

In describing the invention reference will be made to the accompanying drawings, in which:

Figure 1 is a perspective view of my improved visor with the glare eliminator for the rear-view mirror partly withdrawn from its sheath, the main glare eliminator shown in dotted lines in partially withdrawn position and the side wing extended.

Figure 2 is a perspective view, partly in section and on a greatly enlarged scale, of the right hand half of the structure shown in Figure 1.

Figure 3 is a longitudinal sectional view taken substantially on the line 3—3 of Figure 2.

2

Figure 4 is a perspective view of a portion of the visor looking towards the side opposite to that shown in Figure 1.

Like numerals of reference indicate corresponding parts in the various figures.

Referring to the drawings, in which the present preferred embodiment of the invention is shown, 1 indicates the main frame, or body, of the visor, which consists of a sheet of metal, fibreboard, plastic or other material in itself suitably rigid, or which is rendered suitably rigid, to support the various appendages to be described in detail hereinafter.

The body 1 is either constructed of an opaque material or is suitably covered so that in itself it may constitute a shade for the eyes of the driver, to be adjusted upwardly or downwardly in an arc by the driver at will.

The body 1 is provided with an arm 2 which preferably extends the full length of the body at one side and along the top edge thereof and is secured to the body in any desired manner and projects outwardly beyond the body at one end thereof and terminates in a ball 3.

4 is a bracket which is adapted to be secured to some convenient part of the vehicle, at either side of the vehicle depending on the desire of the user. The means for fastening the bracket to the vehicle to permit of lateral adjustment of the bracket, preferably consists of bolt or screw members 5 extending through curved slots 6 in the bracket and entering the vehicle part. The bracket 4 has a fixed arm 7 extending outwardly therefrom and provided with an upwardly turned bearing part 8.

The visor is adapted to be supported from the vehicle frame through the medium of a sectional clamp 9 formed of opposed sections shaped to provide jaws 10 and 11, adapted to engage the vertical part 8 of the bracket 4 and the ball-shaped end 3 of the arm 2, respectively. Independent opening and closing of the respective jaws is obtained by means of bolts 12 and 13 respectively, placed at like sides of said jaws so that the visor can be adjusted as to height in respect to the vertical member 8 of the bracket 4 through the jaws 10 and is susceptible of universal adjustment within the jaws 11 and can be readily locked to their adjusted positions.

14 is a light screen which may be made of glass, plastic, or other material and which may be of any desired color of a density which will shut out such percentage of reflected light rays as would be likely to cause injury to the eyes, or make driving unsafe, but which will be sufficiently transparent to insure clear vision. In this connection it is suggested that material of a color density which will let in from ten to eighteen per cent of reflected light has been found to give the best results for safety in every respect.

For descriptive purposes the normal (inoperative) position of the transparent screen 14 may be said to be one parallel with the inner face of the body plate 1 and the operative position to be one overlapping that edge of the body opposite to that near which the arm 2 is located, the distance to provide a screen of the depth desired by the user. As the visor must of necessity, to render the screen operative effectively, be turned to a substantially vertical position the edge of the body 1 over which the screen projects is herein termed the lower edge.

The screen 14 is shown as being considerably shorter than the body 1 and is substantially equal in depth thereto and is adapted to be mounted medially of the ends of said body for sliding movement parallel therewith in guide brackets 15 and 16 secured to the face of the body.

The screen is provided with fixed rails 17 and 18 which project edgewise thereof along the top edge in spaced parallel relation to one another throughout the length of the screen whereby to provide a housing for rollers 19 and 20 located at the opposite ends respectively of the screen and which are mounted to project outwardly somewhat beyond the ends of the screen, as is clearly shown in Figure 2.

The guide brackets 15 and 16 extend transversely of the body 1 and are formed to provide opposed outwardly extending wall portions 21 spaced to provide a sliding fit for the screen and backing for the rollers and, preferably though not necessarily having offset medial portions providing channels 22 in which the rollers are adapted to ride and against the bases of which said rollers are adapted to be pressed in the manner to be described hereinafter, to hold the screen to any desired position, and inwardly turned portions 23 adapted to overlap the screen.

The rollers 19 and 20 have their axles 24 journaled in elongated bearing slots 25 which are provided in the rails 17 and 18 in aligned relation to one another near opposite ends of the screen. The rollers are urged independently outwardly beyond the respective ends of the screen and into frictional running engagement with the bases of the channels 22 of the opposed lateral walls of the brackets 15 and 16 by means of helical springs 26 which are confined between fixed blocks 27 located inwardly from the ends of the screen and substantially U-shaped brackets 28 which span the respective rollers and through the arms of which the axles 24 extend loosely. Bolts 29 extending loosely through the respective blocks 27 and the corresponding end springs 26 and threading into the bodies of the brackets 28 provide means for regulating the tension of the springs independently of each other, so that pressure of the rollers against the bases of the channels 22 can be adjusted to provide the frictional contact necessary to hold the screen to any adjusted position and at the same time permit of easy operation of the screen. The bolts 29 are preferably provided with slots, or otherwise adapted to the accommodation of a tool by means of which they may be adjusted longitudinally in respect to the brackets 28.

The channels 22 in the brackets 15 and 16 are preferably closed near the lower ends of said brackets, as shown at 30 in Figure 1, so as to provide shoulders adapted to limit the outward movement of the rollers and thus prevent complete withdrawal of the screen 14.

Brackets 31 fixed to the body plate 1 extend outwardly therefrom and form stops to limit the inward movement of the screen, the said brackets having right angled portions 32 which overlie the face of the screen in its collapsed position.

33 is a light screen which for purposes of distinction may be termed a rear-view-mirror screen. This screen is adapted to be contained, when not in use, in a housing 34 provided on the opposite face of the visor to that on which the screen 14 is located, and from which it may be projected endwise of the visor into a position before the rear-view mirror so as to render ineffective the glare from light rays reflected onto said mirror.

The screen 33 is preferably substantially rectangular in side elevation and is slidable in the housing 34, which latter is provided between the base of a flanged plate 35 and the face of the body 1 on which said plate is mounted.

The opening in the outer end of the housing is restricted in width in relation to the interior of the housing by means of the flanges 36 extending inwardly at opposite sides of the housing, and the screen is enlarged near its inner end to provide shoulders 37 which will slidably fit within the housing but which cannot, owing to the presence of the flanges 36, pass through the restricted opening, so that while the screen can be readily moved inwardly and outwardly it cannot be completely withdrawn from the housing.

It is of course understood that the screen 33 may be made of any suitable material capable of transmitting the desired percentage of the light rays to which it is subjected so that one may get full advantage of the rear-view mirror without experiencing glare, whether from the effect of the sun or headlights from a following vehicle.

38 is a wing member which may be made of an opaque material or of glass, plastic, or other transparent material suitably colored to admit only a predetermined amount of light therethrough, said wing member being hinged, as shown at 39, to the body of the visor at the end nearest the point of attachment of the visor to the vehicle frame. This wing member may overlie the face of the visor when not in use and when required to shut off or subdue side light may simply be swung outwardly on its hinge to the position to give the desired result.

It is of course to be understood that the whole device may be enclosed within a cover 40 of any desired material, if so desired, such cover being so arranged as to provide openings for the passage of the screens 14 and 33 to and from their operative positions.

The body member 1 and the member 35 are preferably provided, in their respective edges over which the screens pass, with notches 41 and 42, respectively, to facilitate grasping the screens in the withdrawal thereof.

In the use of the invention the visor, which has previously been secured to the vehicle frame in the desired location by means of the clamping member 9, may be easily turned to the position best suited to shading the eyes, or may be moved entirely out of operative position if not wanted.

In the event that the eye shade only is found not to give sufficient protection, such as when facing the sun, or glaring headlights, it is simply necessary to lower the visor to a substantially vertical position and to pull down on the screen 14 so that it will come between the user and the light requiring to be subdued. It will be found that the outward pressure exerted by the spring-influenced springs 26, if properly tensioned by means of the bolts 29, against the lateral walls of the brackets 15 and 16 will hold the screen in any position in which it may be set.

Where the lights from a following vehicle cast a glare on the rear-view mirror an outward pull on the transparent colored screen 33 to bring same into position before the mirror will subdue the light to safe proportions. Light from the side can be subdued by extending the wing member 38 on its hinge.

While I have described and shown herein the present preferred method for carrying out my said invention this is capable of variation and modification without departing from the spirit of the invention. I, therefore, do not wish to be limited to the precise details of construction as set out herein but wish to avail myself of such variations and modifications as come within the scope of the appended claims.

What I claim is:

1. A visor comprising a substantially rectangular body of opaque sheet material constituting an eye shade, adjustable supporting means for said body, a transparent light screen having an inoperative position overlying one face of said body and being movable into an operative position overlying one edge of said body, a pair of brackets secured transversely of said body in spaced parallel relation to one another and constituting a frame in which said transparent screen is slidable to and from its operative positions, rollers carried by said screen and extending from opposite ends thereof in engagement with the opposed faces of said brackets, and spring means urging said rollers into frictional contact with said faces of said brackets to hold said screen to any adjusted position.

2. A visor as set out in claim 1, in which said brackets have their opposed faces provided with medial longitudinal U-shaped channels against the bases of which said rollers are spring pressed, said channels being closed at their ends from which said light screen projects to prevent total withdrawal of said screen.

3. In a visor, a substantially rectangular body of opaque sheet material constituting an eye shade, adjustable mounting means for said eye shade, a pair of brackets mounted transversely of one face of said body in spaced parallel relation to one another, a transparent light screen having an inoperative position wholly aaginst the face of said body and slidable between said brackets to operative position overlying the lower edge of said body, the said light screen having spaced parallel edgewise extending flanges along its top edge, the said flanges having aligned elongated bearing slots therethrough near their respective ends, rollers positioned between said flanges and projecting beyond said body at the opposite ends thereof into contact with said brackets, the said rollers having axles journaled in the aligned bearing slots in said flanges, and spring-pressed means engaging the respective axles and exerting outward influence thereagainst individually to force said rollers into frictional contact with the respective brackets whereby to hold said light screen to any adjusted position.

4. A visor as set out in claim 3, in which the spring means exerting outward influence on the axles of said rollers comprises substantially U-shaped brackets positioned between the said flanges inwardly of the respective rollers and having their arms engaging the axles of the respective rollers, fixed frame members positioned inwardly from said U-shaped brackets and spaced therefrom, adjusting screws extending loosely through said frame members and threading into the respective U-shaped brackets, and spring means encircling the said adjusting screws and confined under compression between the said fixed frame members and the associated U-shaped brackets.

5. A visor as set out in claim 3, characterised by lateral stop members fixed to said body near its top edge and preventing upward movement of the said light screen beyond a position wholly within the confines of said body.

6. A visor as set out in claim 3, characterised by a second transparent light screen normally concealed at the side of said body opposite to that on which the first mentioned light screen is located, said second light screen being manually extendible from one edge of said body into operative position, a plate secured to said body and with said body providing an open-ended housing for said second mentioned screen, and stop means limiting the extendible movement of said second light screen.

WILLIAM P. SOLMES.

REFERENCES CITED

The following references are of record in the file of this patent:

UNITED STATES PATENTS

| Number | Name | Date |
|---|---|---|
| 1,898,276 | Van Dresser | Feb. 21, 1933 |
| 2,385,557 | Ward | Sept. 25, 1945 |
| 2,422,863 | Stroth | June 24, 1947 |